Mar. 6, 1923.

F. GUYTON.
AUTOMATIC OIL TANK SWITCH.
FILED MAR. 1, 1921.

1,447,843.

2 SHEETS—SHEET 1.

Inventor
F. Guyton
By ..........., Attorney

Mar. 6, 1923.
F. GUYTON.
AUTOMATIC OIL TANK SWITCH.
FILED MAR. 1, 1921.
1,447,843.
2 SHEETS—SHEET 2.
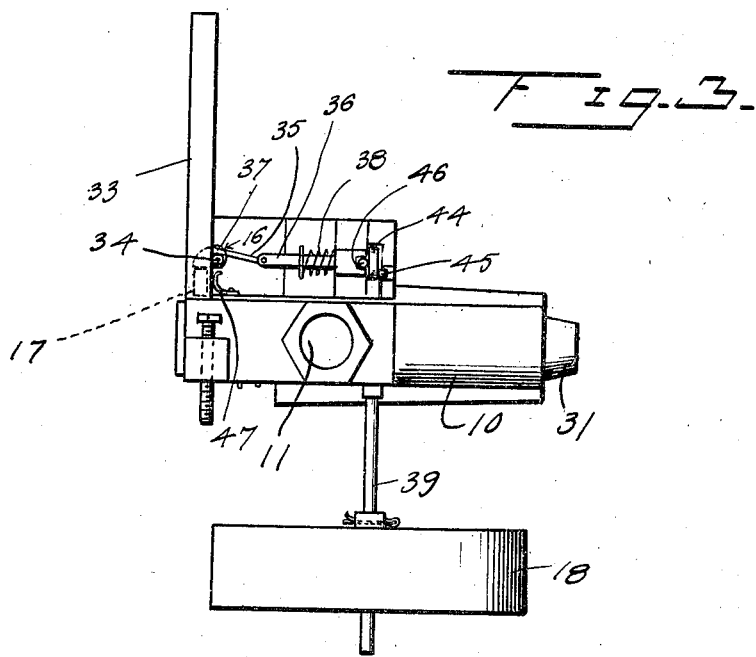
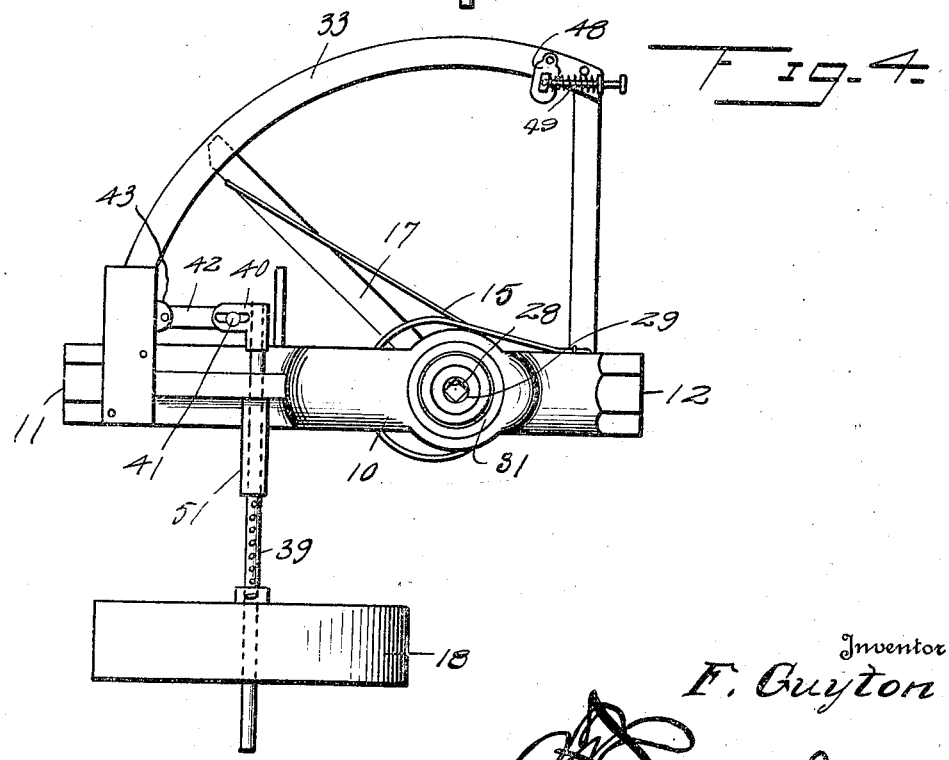
Inventor
F. Guyton
By
Attorney Patented Mar. 6, 1923.

1,447,843

UNITED STATES PATENT OFFICE.

FRANK GUYTON, OF TURLEY, OKLAHOMA.

AUTOMATIC OIL-TANK SWITCH.

Application filed March 1, 1921. Serial No. 448,946.

*To all whom it may concern:*

Be it known that I, FRANK GUYTON, a citizen of the United States, residing at Turley, in the county of Tulsa and State of Oklahoma, have invented certain new and useful Improvements in Automatic Oil-Tank Switches; and I do hereby declare the following to be a full, clear, and exact description of the invention, such as will enable others skilled in the art to which it appertains to make and use the same.

Figure 1:
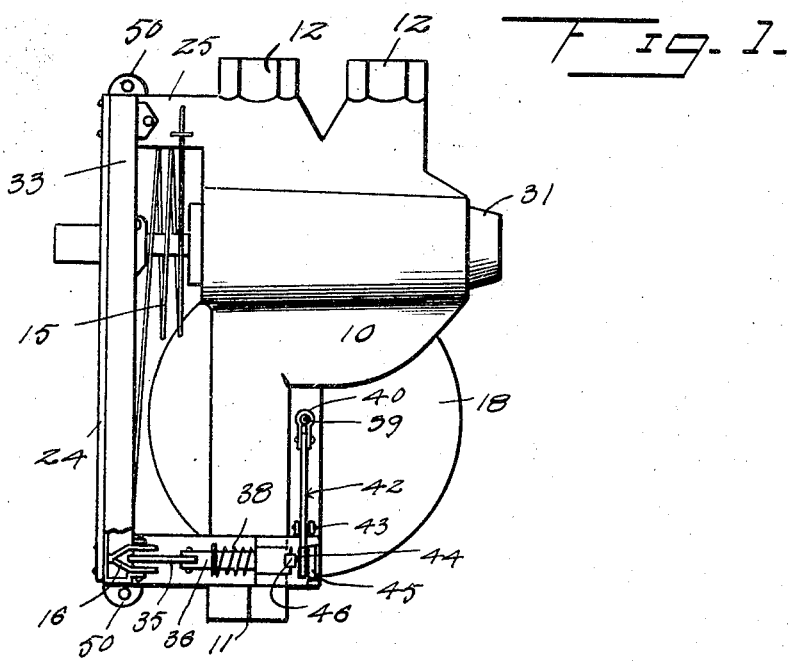
Figure 2:
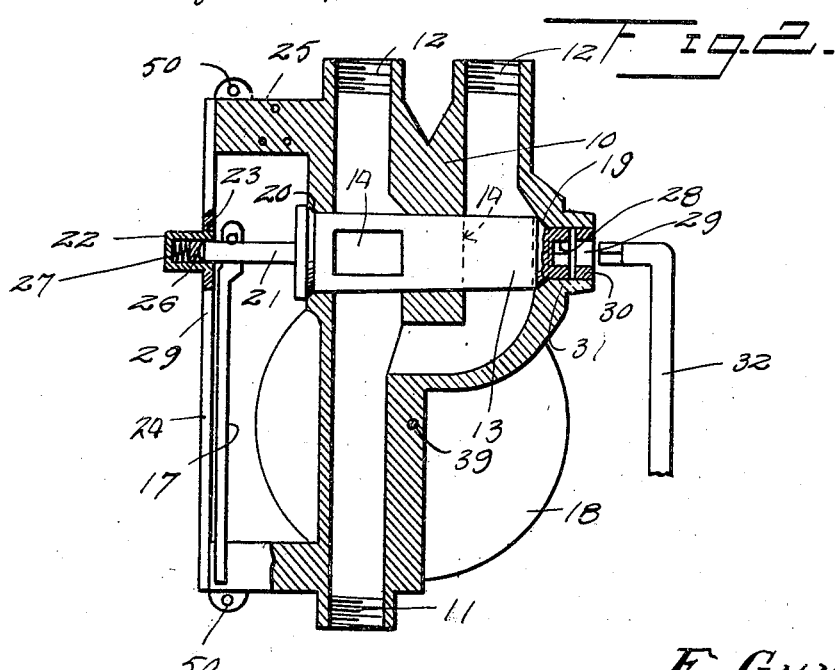

The object of the invention is to provide simple and efficient means for controlling the delivery of oil or other liquid from a source of supply to tanks or other receptacles to be filled therewith, whereby as each tank or receptacle is filled, the flow of material from the supply is diverted to another tank or receptacle to avoid overcharging a tank and causing the overflow thereof, the transfer of the discharge from one tank or receptacle to the next in the series being accomplished automatically and without manual intervention after the apparatus has been positioned and the liquid permitted to flow therethrough by opening the control valve at the source of supply; and in this connection it is an object to provide for the purpose indicated a device embodying a coupling which may be interposed in the supply line between the source of supply and the tanks or receptacles to be filled or charged and adapted to be moved from place to place as required in the consecutive filling of tanks arranged in batteries; and with these general objects in view the invention consists in a construction, combination and relation of parts of which a preferred embodiment is shown in the accompanying drawings, wherein Figure 1 is a plan view of the apparatus, Figure 2 is a horizontal sectional view of the same, Figure 3 is an end view, Figure 4 is a side view.

The device consists essentially of a fork or Y coupling 10 having an inlet arm or passage 11 for connection with a suitable source of supply (not shown) and a plurality of outlet arms or passages 12 adapted for respective connection with tanks or other receptacles to be filled, said outlet passages being controlled by a two-way valve 13 having a plurality of openings 14 for registration with the outlet passages; yielding means such as a spring 15 for moving the valve from one set position to another to bring succeeding outlet passages into communication with the inlet passage; latch mechanism including a latch 16 for engaging an arm 17 attached to the spindle of the valve 13 to lock the latter in one of its adjusted positions; and trip mechanism actuable by a float 18 adapted to be arranged in the path of the liquid contents of the tank or receptacle to be filled, so as to be actuated thereby to disengage the latch mechanism and release the valve for movement to the succeeding adjusted position under the influence of the spring 15 or its equivalent.

In the construction illustrated the valve 13 is provided with ground shoulders 19 and 20 of conical form for engagement with corresponding seats in the casting forming the coupling and is provided with a spindle portion 21 fitted in a cap 22 threaded as at 23 in a bar 24 forming an attachment to a lateral arm 25 of said casting, a follower 26 being arranged in the cap in bearing contact with the extremity of said spindle 21 and being yieldingly actuated by a spring 27 serving to impel the valve in a direction to maintain oil tight contact of its ground shoulders with the seats provided therefor. In the opposite end of the valve core there is provided an angular wrench seat 28 accessible through an opening 29 in a ring 30 fitted in the end of the bearing 31 in the casting, for engagement by a wrench 32 by which the valve may be moved in opposition to the tension of the spring 15 which serves as above noted to turn the valve from one set position to another.

The free end of the arm 17 operates in a grooved quadrant guide 33 adjacent to one end of which and intersecting the path of the arm is arranged the latch 16 pivoted as at 34 and having connection by a link 35 with a bolt 36 mounted for reciprocatory movement, the link 35 being eccentrically connected as at 37 with said latch and serving when moved in the direction indicated by the arrow in Figure 3 to project across the path of the arm 17, and being impelled in said direction so as to normally maintain the latch in the arm engaging position by means of a spring 38. The float 18 is carried by a stem 39 upon which it is threaded for adjustment to regulate the height thereof in the tank and therefore the level at which it will be affected by the liquid contents of the tank, and said stem at its upper end carries a head 40 having a pivotal and slotted connection as indicated at 41 with a trip arm 42 fulcrumed as at 43 and having a nose 44 normally arranged in the path of movement of the bolt 36 in the opposite direction to that indicated by the said arrow in Figure 3. The trip arm nose operates between an anti-friction guide 45 and a similar anti-friction roll 46 carried by the bolt to avoid unnecessary resistance to the movement of the trip arm when actuated by the float. When the valve is turned to carry the arm 17 into engaging relation with the latch 16, the latter being normally and yieldingly held in the position indicated in Figure 3 in which it intersects the path of said arm 17, the latch will be depressed to permit the arm to pass, excessive movement of the latch being prevented by a stop spring 47 arranged in the path thereof, but owing to the fact that the trip arm 42 is in the path of movement of the bolt 36, the movement of the arm 17 in the opposite direction, tending to swing the latch upward at its free end is prevented, and said arm 17 and therefore the valve with which it is connected is locked in the position, for example, which opens the communication between the inlet passage 11 and the outlet passage which is in alinement therewith as indicated in Figure 2. These relations of the parts are retained therefore, the valve actuating spring 15 being under tension, until the liquid contents of the tank or receptacle which is being filled have reached a level serving to raise the float 18, whereupon the elevation by the head 40 of one end of the trip arm 42 will depress the nose 44 out of the path of the bolt 36 and the tension of the spring 15 will then cause the arm 17 to deflect the latch 16, thus releasing the arm and permitting the valve to be turned by the spring 15 to the position closing the outlet passage previously in operation and opening the other of said passages which is in communication with the succeeding tank or receptacle. It is to be understood that usually the quantity of liquid dispensed to the battery of tanks or receptacles is predetermined so as to avoid overflow from the last tank filled.

In the path of swinging movement of the arm 17 under the impulse of the spring 15 there is located a yielding stop consisting of a pivotal ear 48 with which is connected a spring actuated bolt 49.

Obviously any suitable means may be provided whereby the device may be secured to a suitable support such as the top of a tank, and to this end, ears 50 are arranged upon the frame for the reception of suitable bolts, and also in practice it is preferable to house or encase the latch mechanism so as to protect the same from moisture, accumulations of dust and oil and the like. Also to serve as a means of maintaining a proper position of the float stem 39 a tubular guide 51 may be employed, as indicated clearly in Figure 4.

What is claimed is:—

1. An apparatus for the purpose described having a two-way outlet and a valve for controlling the same, means tensioned for moving the valve from one position to another and open one of said ways when the other is closed, an arm extending from the valve stem, latch mechanism for securing the arm and valve in one position in opposition to the said means, a float operating trip for controlling the latch mechanism operable by material rising in the receptacle being filled, a segmental guide for and grooved to receive the free end of said arm, and a yielding bumper arranged in the path of movement of the arm under the impulse of said means.

2. An apparatus for the purpose described having a two-way outlet and a valve for controlling the same, means tensioned for moving the valve from one position to another to open one of said ways as the other is closed, an arm extending from the valve, latch mechanism for securing the arm and valve in one position in opposition to said means, a float operating trip for controlling the latch mechanism operable by material rising in the receptacle being filled, the latch mechanism having a latch normally disposed in the path of movement of said arm, a bolt connected with said latch and a trip mechanism having a trip arm normally arranged in the path of movement of said bolt.

3. An apparatus for the purpose described having a two-way outlet and a valve for controlling the same, means tensioned for moving the valve from one position to another to automatically open one of said ways as the other is closed, an arm extending from the valve stem, latch mechanism for securing the arm and valve in one position in opposition to said means, a float operated trip for controlling the latch mechanism operable by material rising in the receptacle being filled, the latch mechanism having a pivotal latch yieldingly held operating in the path of movement of said arm, and a stop spring arranged in the path of movement of the latch when deflected by said arm.

4. An apparatus for the purpose described having a two-way outlet and a valve for controlling the same, means for moving the valve from one position to another to automatically open one of said ways as the other is closed, an arm connected with the valve stem, latch mechanism for securing the arm with the valve in one position in opposition to the said means a float operated trip for controlling the latch mechanism operable by the rising of material in the receptacle being filled, the latch mechanism having a pivotal latch with a spring actuated bolt having a link connection with the latch, and said link being eccentrically connected with the latch.

In testimony whereof I affix my signature in presence of two witnesses.

FRANK GUYTON.

Witnesses:
 W. B. BLAIR,
 GEO. J. DISS.